(12) United States Patent
Han et al.

(10) Patent No.: US 10,114,684 B2
(45) Date of Patent: Oct. 30, 2018

(54) CONTENT DISPLAY CONTROL APPARATUS AND CONTENT DISPLAY CONTROL METHOD

(71) Applicant: NAVER Corporation, Seongnam-si (KR)

(72) Inventors: Seung Kyun Han, Seongnam-si (KR); Sang Bum Kim, Seongnam-si (KR); Ji Seoung Kim, Seongnam-si (KR); Hyeon Tae Jeong, Seongnam-si (KR); Yeon Hee Jung, Seongnam-si (KR); So Ra Goo, Seongnam-si (KR)

(73) Assignee: NAVER Corporation, Seongnam-si (KR)

( * ) Notice: Subject to any disclaimer, the term of this patent is extended or adjusted under 35 U.S.C. 154(b) by 340 days.

(21) Appl. No.: 14/824,875

(22) Filed: Aug. 12, 2015

(65) Prior Publication Data
US 2016/0048279 A1 Feb. 18, 2016

(30) Foreign Application Priority Data

Aug. 12, 2014 (KR) ........................ 10-2014-0104527

(51) Int. Cl.
*G06F 3/00* (2006.01)
*G06F 9/54* (2006.01)
*G06F 17/30* (2006.01)

(52) U.S. Cl.
CPC ........ *G06F 9/542* (2013.01); *G06F 17/30265* (2013.01); *G06F 17/30274* (2013.01)

(58) Field of Classification Search
CPC .... G06F 9/542; G06F 3/0484; G06F 3/04883; G06F 21/36
See application file for complete search history.

(56) References Cited

U.S. PATENT DOCUMENTS

| | | | | |
|---|---|---|---|---|
| 6,999,614 B1 * | 2/2006 | Bakker | ................. | G06T 7/0004 382/145 |
| 8,009,919 B2 * | 8/2011 | Baiping | ............ | G06F 17/30265 348/333.01 |
| 8,073,265 B2 * | 12/2011 | Liao | .................. | G06F 17/30244 348/231.2 |

(Continued)

FOREIGN PATENT DOCUMENTS

| | | |
|---|---|---|
| JP | 2008-77138 | 4/2008 |
| KR | 10-2008-0026063 | 3/2008 |

(Continued)

OTHER PUBLICATIONS

Notice of Allowance dated Dec. 11, 2015 of the Korean patent application No. 10-2014-0104527.

(Continued)

*Primary Examiner* — Nicholas Augustine
(74) *Attorney, Agent, or Firm* — Greer, Burns & Crain, Ltd.

(57) ABSTRACT

A content display control apparatus, a content display control method, and a computer program for executing the content display control method on a computer, whereby one or more clusters are formed from location information of a plurality of pieces of contents, an event cluster having a high probability of an event occurrence is selected, and the selected event cluster are provided to a user, thereby easily organizing and keeping the contents.

16 Claims, 13 Drawing Sheets

(56) References Cited

U.S. PATENT DOCUMENTS

| | | | |
|---|---|---|---|
| 8,457,469 B2* | 6/2013 | Suzuki | G06K 9/00711 |
| | | | 386/239 |
| 8,571,381 B2* | 10/2013 | Suzuki | H04N 21/8456 |
| | | | 386/230 |
| 9,047,847 B2* | 6/2015 | Hochmuth | G09G 5/377 |
| 2008/0089593 A1 | 4/2008 | Ohwa | |
| 2009/0077132 A1* | 3/2009 | Yamamoto | G06F 17/30867 |
| 2010/0145948 A1 | 6/2010 | Yang et al. | |
| 2010/0281036 A1* | 11/2010 | Inoue | G06F 17/30979 |
| | | | 707/749 |
| 2011/0122153 A1* | 5/2011 | Okamura | G01C 21/00 |
| | | | 345/629 |
| 2011/0126148 A1 | 5/2011 | Krishnaraj et al. | |
| 2012/0254790 A1* | 10/2012 | Colombino | G06F 3/0482 |
| | | | 715/781 |
| 2013/0129153 A1* | 5/2013 | Miyashita | G06F 17/30265 |
| | | | 382/106 |
| 2014/0218394 A1* | 8/2014 | Hochmuth | G09G 5/377 |
| | | | 345/629 |

FOREIGN PATENT DOCUMENTS

| | | |
|---|---|---|
| KR | 10-2010-0066606 | 6/2010 |
| KR | 10-2012-0113738 | 10/2012 |
| WO | WO 2011/066167 A1 | 6/2011 |

OTHER PUBLICATIONS

Office Action issued by the Korean Industrial Property Office in corresponding Korean Patent App. No. 10-2014-0104527, dated Jun. 4, 2015.

* cited by examiner

CONTENT DISPLAY CONTROL APPARATUS AND CONTENT DISPLAY CONTROL METHOD

CROSS-REFERENCE TO RELATED APPLICATION

This application claims the benefit of Korean Patent Application No. 10-2014-0104527, filed on Aug. 12, 2014, in the Korean Intellectual Property Office, the disclosure of which is incorporated herein in its entirety by reference.

BACKGROUND

1. Field

One or more exemplary embodiments of the present invention relate to a content display control apparatus, a content display control method, and a computer program for executing the content display control method on a computer.

2. Description of the Related Art

The amount of storable digital content has been geometrically increasing since mass-storage digital storage devices such as a hard disk drive, flash memory, etc. have been recently popularized.

In addition, since peer to peer, online shops, user created content (UCC), etc. are popularly invigorated, the types and amount of digital content handled by multimedia devices such as an MP3 player, a digital TV, a personal video recorder (PVR), a portable multimedia player (PMP), etc. are increasing.

Accordingly, a demand for browsing content in various forms increases, and various browsing methods are used to browse content.

Meanwhile, owing to the development of memory technology, high integrated/ultra small memory is generalized, and owing to the development of digital image compression technology that does not greatly damage image quality, a great amount of digital content may be stored in multimedia devices, and thus a system and a method for effectively managing the stored digital content are needed.

Information disclosed in this Background section was already known to the inventors before achieving the inventive concept or is technical information acquired in the process of achieving the inventive concept. Therefore, it may contain information that does not form the prior art that is already known to the public in this country.

SUMMARY

One or more exemplary embodiments of the present invention include a content display control apparatus, a content display control method, and a computer program for executing the content display control method on a computer whereby one or more clusters are formed from location information of a plurality of pieces of contents, an event cluster having a high probability of an event occurrence is selected, and the selected event cluster is provided to a user, thereby easily organizing and keeping the contents.

One or more exemplary embodiments include a content display control apparatus, a content display control method, and a computer program for executing the content display control method on a computer whereby an event cluster is selected and provided to a user, thereby allowing the user to more quickly and conveniently approach desired content, improving user convenience, and increasing UI/UX interest.

One or more exemplary embodiments include a content display control apparatus, a content display control method, and a computer program for executing the content display control method on a computer.

One or more exemplary embodiments include a display control apparatus, a display control method, and a computer program for executing the content display control method on a computer whereby location information is provided to content having no location information among contents, thereby performing more accurate clustering and simultaneously preventing content from being left out from clustering.

Additional aspects will be set forth in part in the description which follows and, in part, will be apparent from the description, or may be learned by practice of the presented embodiments.

According to one or more exemplary embodiments, a content display control apparatus includes a distance limit point calculation unit for calculating a distance limit point from location information of one or more pieces of contents; a content clustering unit for, if contents included in the distance limit point is more than a predetermined number, clustering the contents into one cluster; a main region selecting unit for selecting a main region from among clustered one or more clusters; and an event cluster extracting unit for selecting an event cluster in which an event is expected to occur with respect to the selected main region.

According to one or more exemplary embodiments, a content display control method includes calculating a distance limit point from location information of one or more pieces of contents by a distance limit point calculation unit; if contents included in the distance limit point is more than a predetermined number, clustering the contents into one cluster by a content clustering unit; selecting a main region from among clustered one or more clusters by a main region selecting unit; and selecting an event cluster in which an event is expected to occur with respect to the selected main region by an event cluster extracting unit.

According to one or more exemplary embodiments, a computer program stored on a medium to execute the content display control method by using a computer is provided.

BRIEF DESCRIPTION OF THE DRAWINGS

These and/or other aspects will become apparent and more readily appreciated from the following description of the embodiments of the present invention, taken in conjunction with the accompanying drawings in which.

DETAILED DESCRIPTION

Figure 1:
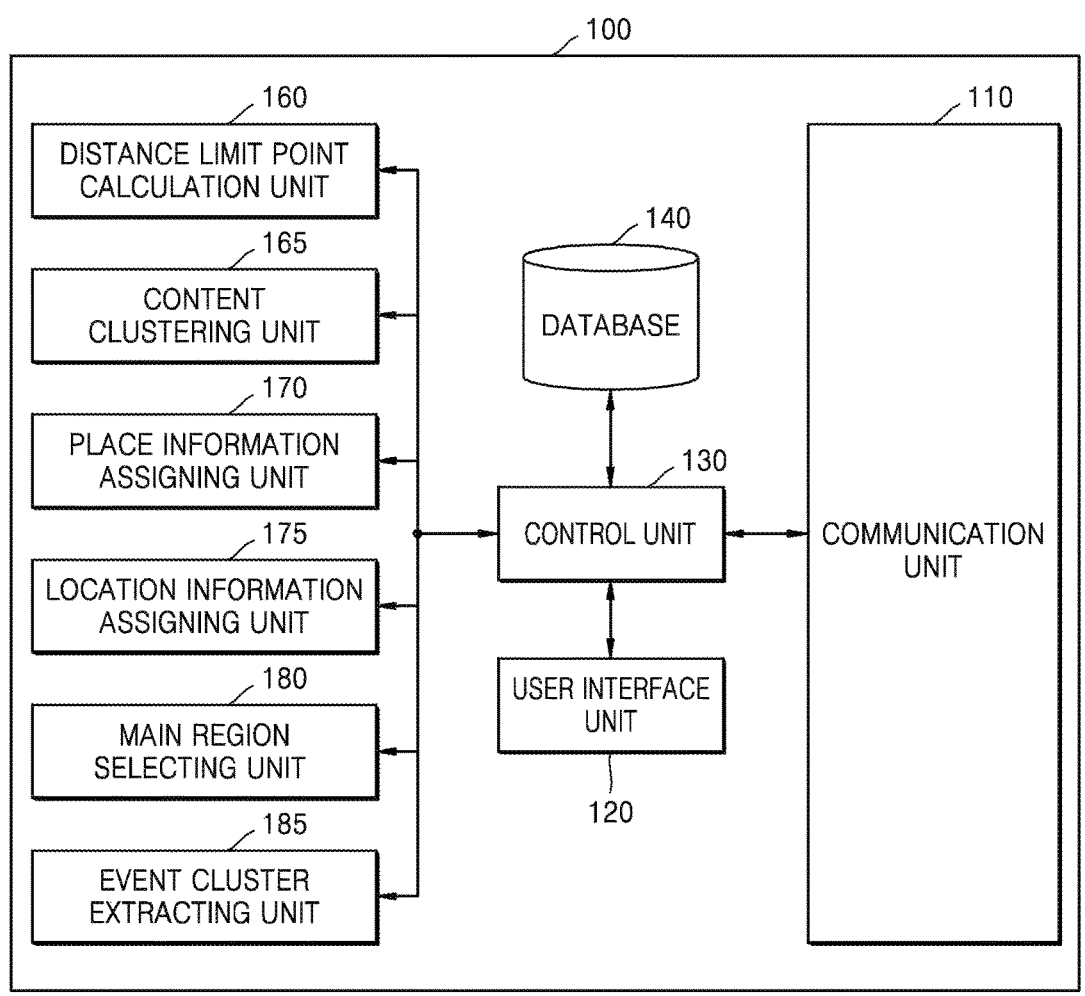
FIG. 1 is a block diagram schematically illustrating a content display control apparatus according to an exemplary embodiment.

Reference will now be made in detail to embodiments of the present invention, examples of which are illustrated in the accompanying drawings, wherein like reference numerals refer to like elements throughout. In this regard, the present embodiments may have different forms and should not be construed as being limited to the descriptions set forth herein. Accordingly, the exemplary embodiments are merely described below, by referring to the figures, to explain aspects of the present description. It will be understood that although the terms "first", "second", etc. may be used herein to describe various components, these components should not be limited by these terms. These components are only used to distinguish one component from another. As used herein, the singular forms "a," "an" and "the" are intended to include the plural forms as well, unless the context clearly indicates otherwise. It will be further understood that the terms "comprises" and/or "comprising" used herein specify the presence of stated features or components, but do not preclude the presence or addition of one or more other features or components. Sizes of elements in the drawings may be exaggerated for convenience of explanation. In other words, since sizes and thicknesses of components in the drawings are arbitrarily illustrated for convenience of explanation, the following embodiments are not limited thereto.

FIG. 1 is a block diagram schematically illustrating a content display control apparatus 100 according to an exemplary embodiment of the present invention.

The content display control apparatus 100 provided according to an exemplary embodiment may correspond to or include at least one processor. Thus, the content display control apparatus 100 may be driven in a form included in another hardware device such as a micro-processor or a computer system. For example, the content display control apparatus 100 may be mounted on a terminal including a display unit capable of displaying a screen.

To prevent a feature of the current embodiment from being obscured, only components of the content display control apparatus 100, which are associated with the present embodiment, are illustrated. Thus, it would be obvious to a person skilled in the art that general-purpose components other than the components illustrated in FIG. 1 may be further included.

Referring to FIG. 1, the content display control apparatus 100 according to an exemplary embodiment controls a screen (see 11 of FIG. 2) of a terminal (see 10 of FIG. 2) to display a page thereon. The content display control apparatus 100 includes a communication unit 110, a user interface unit 120, a control unit 130, and a database 140. The content display control apparatus 100 further includes a distance limit point calculation unit 160, a content clustering unit 165, a place information assigning unit 170, a location information assigning unit 175, a main region selecting unit 180, and an event cluster extracting unit 185.

The communication unit 110 may connect the content display control apparatus 100 to an external server (not shown) over a communication network and transmit or receive data between the content display control apparatus 100 and the external server.

The user interface unit 120 may receive an input signal from a user and simultaneously provide an output signal to the user. The user interface unit 120 may include a keyboard, a mouse, a monitor, etc. The user interface unit 120 may also be a touch screen of a table personal computer.

The control unit 130 displays one or more contents on the user interface unit 120 of the content display control apparatus 100 and receives various commands or operations from the user through the user interface unit 120. The control unit 130 also forms one or more clusters from location information of a plurality of pieces of contents and select an event cluster having a high probability of an event occurrence from among the clusters. This will be described in detail later.

The database 140 may include a content database that stores various pieces of contents provided by the content display control apparatus 100. The database 140 may further store user information of the content display control apparatus 100.

The content display control apparatus 100 further includes the distance limit point calculation unit 160, the content clustering unit 165, the place information assigning unit 170, the location information assigning unit 175, the main region selecting unit 180, and the event cluster extracting unit 185, to form the one or more clusters from the location information of the plurality of pieces of contents and select the event cluster having the high probability of the event occurrence from among the clusters. This will be described in detail later.

Examples of displaying content on the content display control apparatus 100 according to an exemplary embodiment will be described below. FIGS. 2 through 6 are diagrams displaying content on the content display control apparatus 100 according to an exemplary embodiment.

Figure 2:
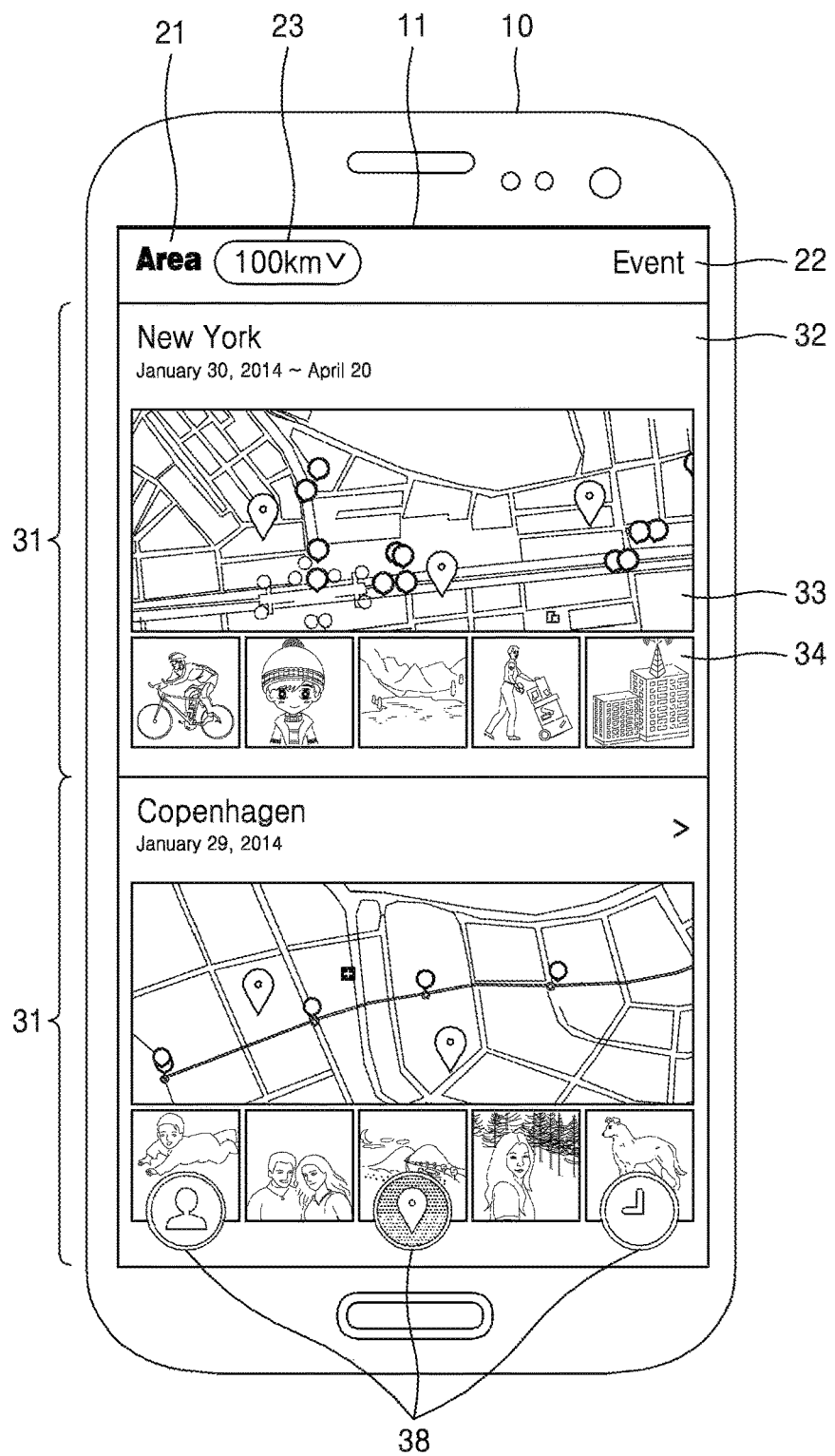
FIGS. 2 through 6 are diagrams displaying content on a content display control apparatus according to an exemplary embodiment.

FIG. 2 illustrates an example of forming a page by arranging a plurality of pieces of contents 31 in a line on the screen 11 of a terminal 10. Each of the contents 31 includes an information display unit 32, a map display unit 33, and a photo display unit 34. The map display unit 33 displays a map of a specific region. The photo display unit 34 displays contents generated in the region displayed on the map display unit 33, for example, photos captured in the region displayed on the map display unit 33. The information display unit 32 displays the name of the region displayed on the map display unit 33 and the date on which the contents are generated in the region displayed on the map display unit 33, for example, the date on which the photos are captured in the corresponding region. For example, FIG. 2 illustrates that the map display unit 33 displays a map of New York, the photo display unit 34 displays at least some photos captured in New York, and the information display unit 32 displays the name "New York" and the date (for example, Jan. 30, 2014~Apr. 20, 2014) on which the photos were captured in New York.

Figure 5:
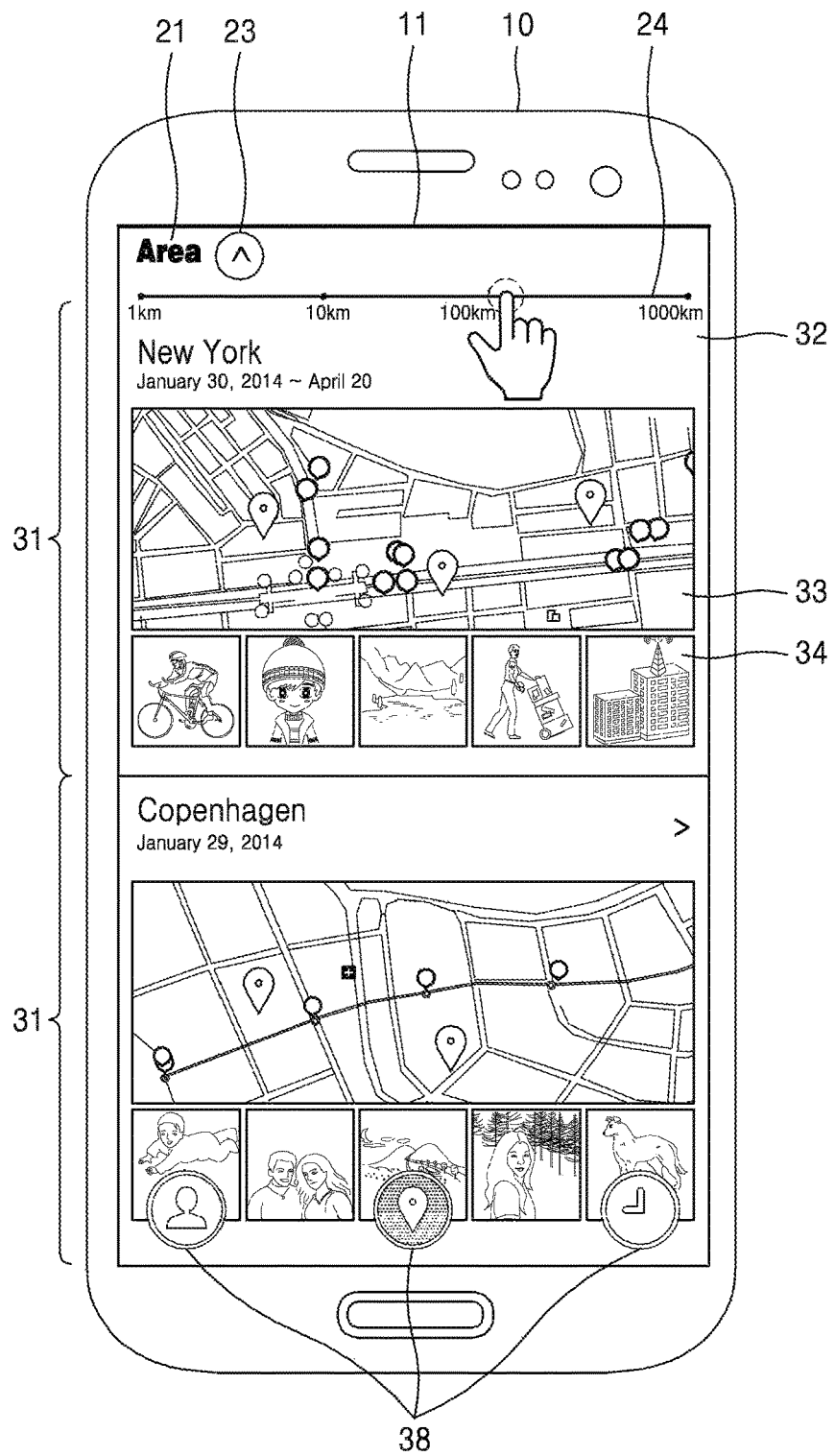
Figure 6:
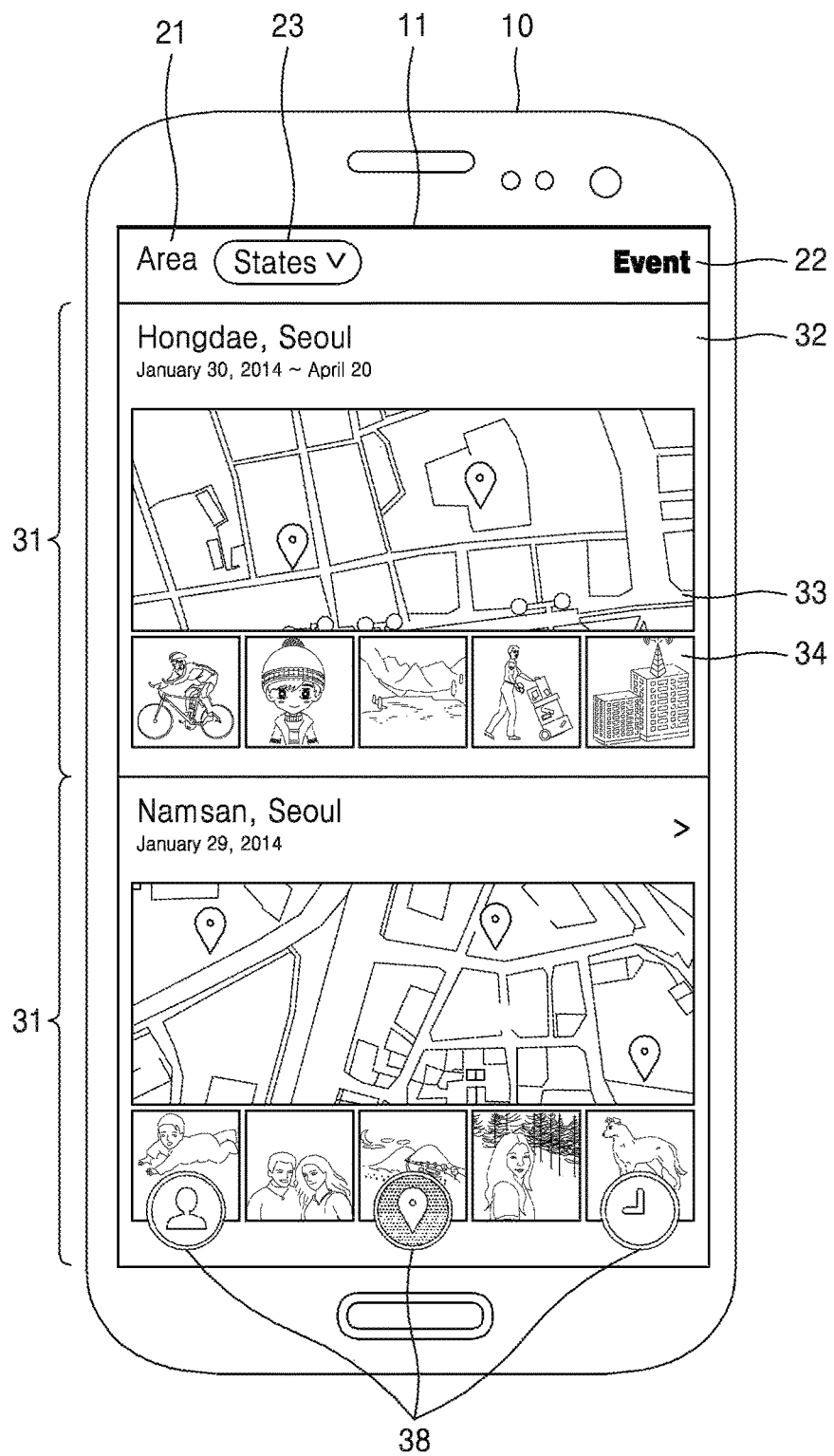

Meanwhile, a region tab 21, an event tab 22, and a scale selection unit 23 may be displayed above the plurality of pieces of contents 31. In this regard, if the region tab 21 is selected by a user input, as shown in FIG. 2, the plurality of pieces of contents 31 stored in the content display control apparatus 100 may be classified according to locations where the plurality of pieces of contents 31 are generated (for example, locations where the photos are captured), and may be displayed with maps of regions corresponding to the plurality of pieces of contents 31. If the scale selection unit 23 is selected by a user input, a selectable scale is displayed. If a predetermined scale is selected by a user input, as shown in FIG. 5, the map displayed on the map display unit 33 may be resized in accordance with the selected scale. If the event tab 22 is selected by a user input, as shown in FIG. 6, maps of regions that belong to event clusters extracted from the plurality of pieces of contents 31 stored in the content display control apparatus 100 may be displayed along with the contents 31 included in the corresponding event clusters. This will be described in detail below.

Figure 3:
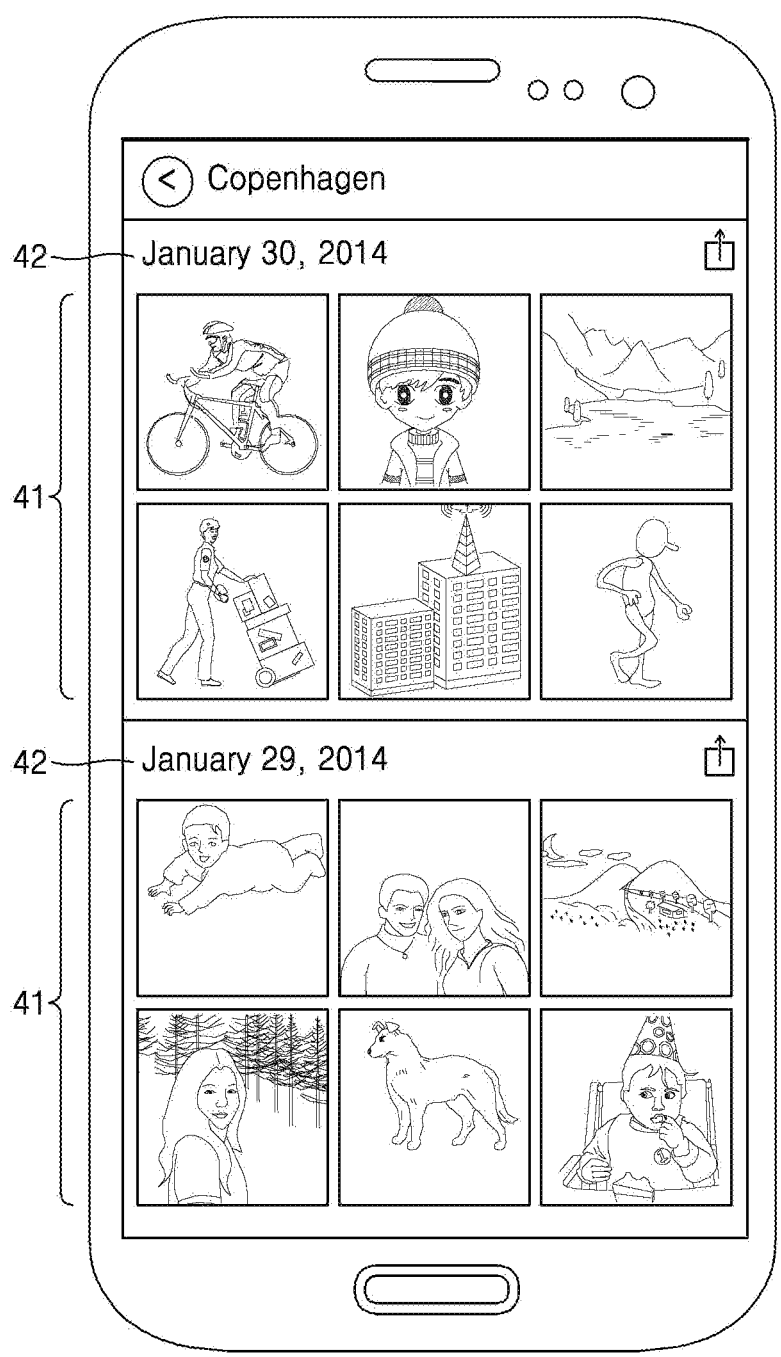

FIG. 3 illustrates a screen displayed when a user selects the information display unit 32 or the photo display unit 34 on the screen 11 of FIG. 2. In more detail, if the user selects the information display unit 32 or the photo display unit 34, at least a part of a page on which contents generated in a corresponding region are arranged in a time sequence is displayed on the screen. That is, a plurality of pieces of content regions 41 are arranged and displayed in a date sequence on the screen. Contents that belong to dates corresponding to the contents may be grouped and displayed on each of the content regions 41. A date display unit 42 may be further displayed on one side of each of the content regions 41 arranged in a date sequence.

Figure 4:
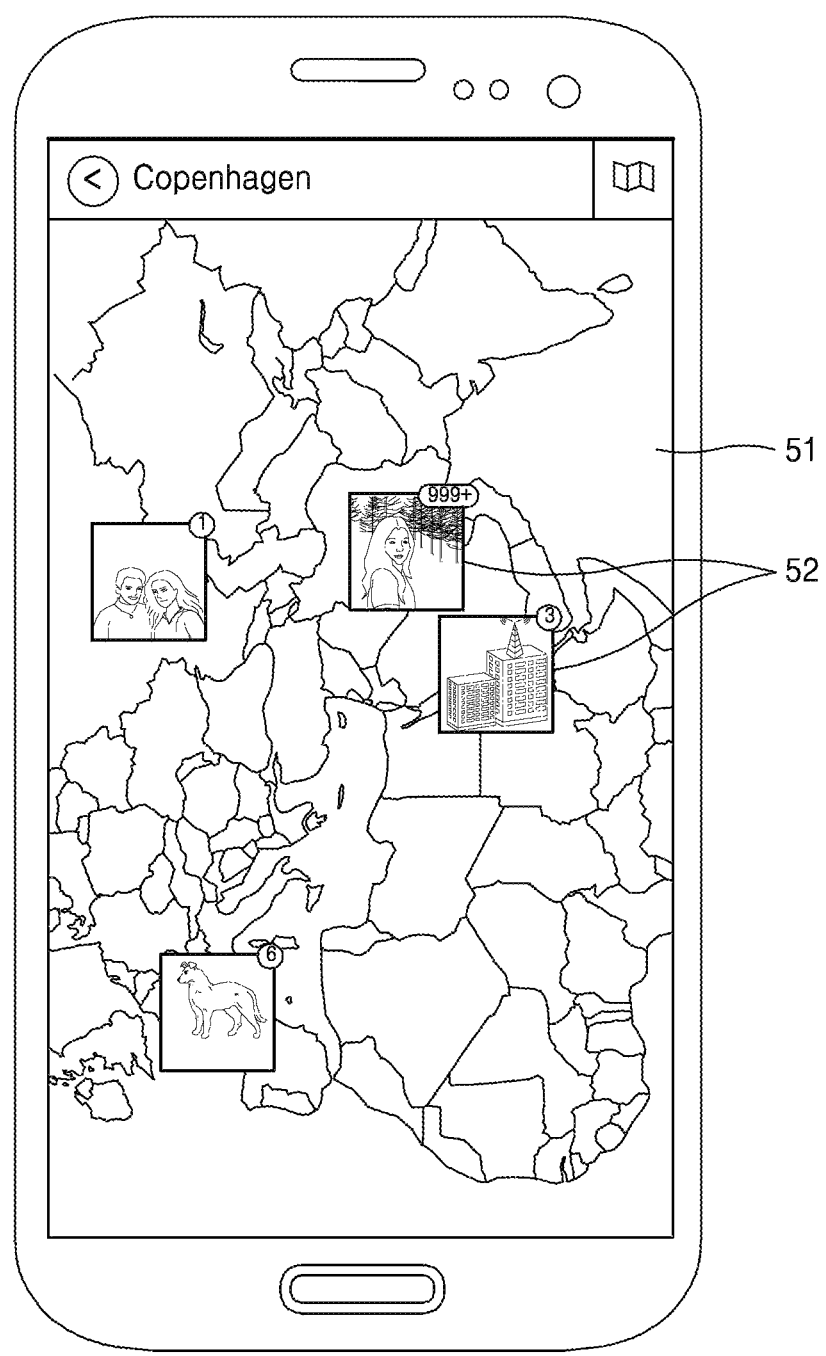

FIG. 4 illustrates a screen displayed when the user selects the map display unit 33 on the screen 11 of FIG. 2. In more detail, if the user selects the map display unit 33, a map of a region corresponding to the selected the map display unit 33 is enlarged and displayed on a map display unit 51. In this regard, one or more content display units 52 are displayed on the map display unit 51 and display at least a part of corresponding content. In this regard, the content display units 52 are displayed on the map display unit 51 on which the contents are generated, and display contents corresponding to the content display units 52. In this regard, when a plurality of pieces of contents are generated in a specific location, representative content is displayed on the content display unit 51, and the total number of contents generated in the specific location may be further displayed on one side of the content display units 52.

FIG. 5 illustrates a screen displayed when the user selects the scale selection unit 23 on the screen 11 of FIG. 2. In more detail, if the user selects the scale selection unit 23, a scale option unit 24 is displayed on one side of the scale selection unit 23 and displays selectable scales. In this state, if the user selects a specific scale on the scale option unit 24, a map displayed on the map display unit 33 is resized in accordance with the selected scale. The selectable scales are displayed in a distance unit on the scale option unit 24 in FIG. 5 but are not limited thereto. The selectable scales may be displayed in an administration district unit, such as country-province-city-neighborhood, on the scale option unit 24.

FIG. 6 illustrates a screen displayed when the user selects the event tab 22 on the screen 11 of FIG. 2. In more detail, if the user selects the event tab 22, maps of regions that belong to event clusters extracted from the plurality of pieces of contents 31 stored in the content display control apparatus 100 are displayed along with the contents 31 included in the event clusters. That is, the content display control apparatus 100 according to an embodiment calculates a distance limit point from location information from one or more contents; if contents included in the distance limit point is more than a predetermined number, clusters corresponding contents into one cluster; selects a main region from among one or more clustered clusters; selects an event cluster in which an event is expected to occur with respect to the selected main region; and, if the user selects the event tab 22, displays a map of a region to which the selected event cluster belongs with the contents included in the event cluster. A method of selecting the event cluster will be described in detail below.

Figure 7:
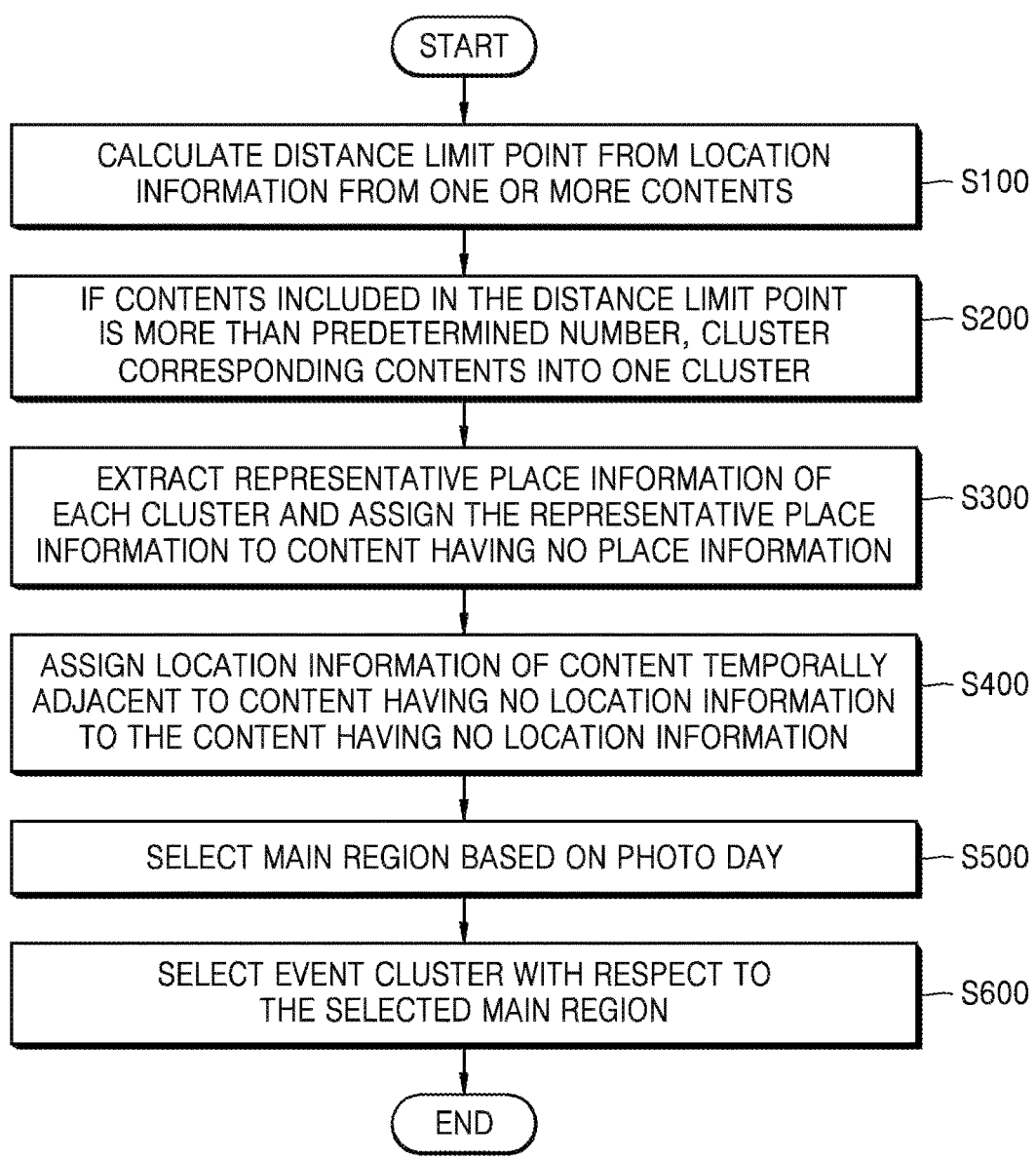
FIG. 7 is a flowchart illustrating a content display control method according to an exemplary embodiment.

FIG. 7 is a flowchart illustrating a content display control method according to an exemplary embodiment of the present invention. The flowchart illustrated in FIG. 7 includes operations that are time-serially processed by the content display control apparatus 100 illustrated in FIG. 1. Thus, although not provided in the following description, the description provided above regarding the components illustrated in FIG. 1 may also be applied to the content display control method illustrated in FIG. 7.

Referring to FIG. 7, the content display control method according to an exemplary embodiment includes an operation of calculating a distance limit point from location information from one or more contents (S100); if contents included in the distance limit point is more than a predetermined number, an operation of clustering contents included in the distance limit point into one cluster (S200); an operation of extracting representative place information of each cluster and assigning the representative place information to content having no place information among the contents of each cluster as place information of the corresponding content (S300); an operation of assigning location information of content temporally adjacent to content having no location information among the contents of each cluster to the content having no location information (S400); an operation of selecting a main region from among the one or more clustered clusters based on a photo day (S500); and an operation of selecting an event cluster in which an event is expected to occur with respect to the selected main region (S600). Each operation will be described in more detail below.

The operation of calculating the distance limit point from the location information from one or more contents (S100) is as follows.

If contents included in a predetermined distance is more than a predetermined number, when the contents are clustered into one cluster, the "predetermined distance" that is a clustering reference may be different depending on an activity range of a user. That is, contents distribution increases for a user having a broad activity range, and thus the "predetermined distance" that is the clustering reference also increases. If not, no cluster may be generated for the user having the broad activity range. Meanwhile, the contents distribution decreases for a user having a narrow activity range, and thus the "predetermined distance" that is the clustering reference also decreases. If not, one cluster includes too many contents for the user having the narrow activity range, and it is meaningless to form a cluster. Thus, it is necessary to individually establish the "predetermined distance" that is the clustering reference for each user.

To this end, the distance limit point calculation unit 160 of FIG. 1 may calculate the distance limit point from the one or more contents.

In this regard, the distance limit point calculation unit 160 may calculate distance values between all contents included in the content display control apparatus 100, extract n distance values from the respective contents to a photo n distance values away from the respective contents, and calculate the distance limit point from the extracted nth distance values.

For example, when 100 photos are stored in the content display control apparatus 100, the distance limit point calculation unit 160 calculates a distance value from location information included in each of the 100 photos to each photo. That is, the distance limit point calculation unit 160 calculates all distance values between the $1^{st}$ photo and the $2^{nd}$ photo, the $1^{st}$ photo and the $3^{rd}$ photo, ..., between the $99^{th}$ photo and the $100^{th}$ photo. Thereafter, the distance limit point calculation unit 160 extracts the distance value from each photo and the $n^{th}$ photo away from the photo, for example, the $10^{th}$ photo away from a photo. That is, the distance limit point calculation unit 160 extracts all distance values from the $1^{st}$ photo to the $10^{th}$ photo away from the $1^{st}$ photo, from the $2^{nd}$ photo to the $10^{th}$ photo away from the $2^{nd}$ photo, ..., from the $100^{th}$ photo to the $10^{th}$ photo away from the $100^{th}$ photo. Thereafter, the distance limit point calculation unit 160 arranges the distance values from each photo to photos that are $10^{th}$ photo away from each photo according to sizes and determines the value in a location of, for example, 75%, among the distance values as the distance limit point of the user. In this regard, 75% is an arbitrarily empirical value but is not limited thereto. The distance limit point calculation unit 160 arranges the distance values from each photo to the $10^{th}$ photo away from each photo according to sizes and determines various values in a predetermined location among the distance values as the distance limit point.

Figure 8:
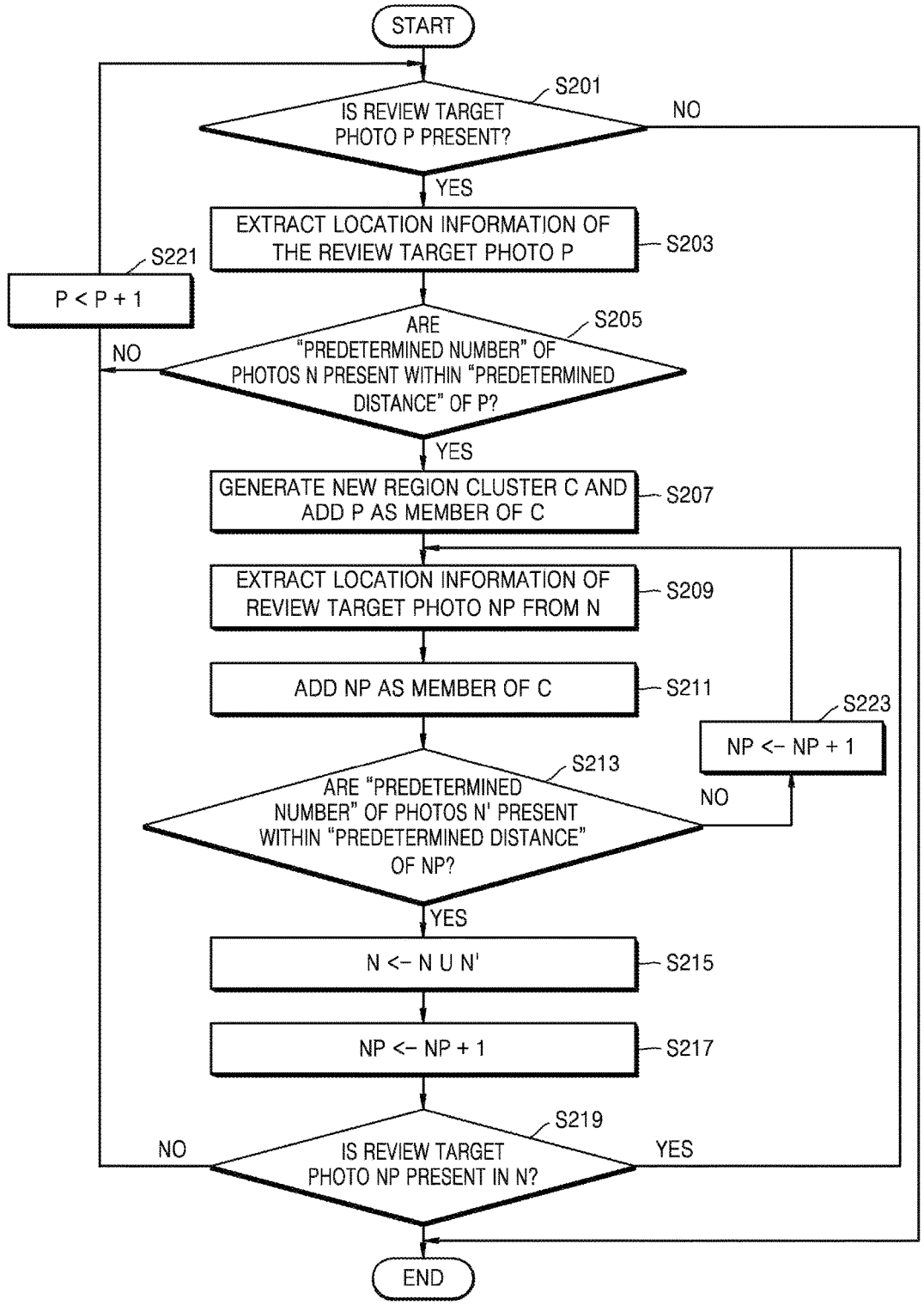
FIG. 8 is a flowchart illustrating an operation S200 of the content display control method of FIG. 7.

FIG. 8 is a flowchart illustrating operation S200 of the content display control method of FIG. 7. Referring to FIG. 8, if contents included in the distance limit point is more than a predetermined number, contents included in the distance limit point may be clustered into one cluster (S200).

In more detail, when contents of a user are clustered, a space more useful to the user may be extracted by clustering the contents based on coordinate information of each of the contents rather than based on an administration district like the conventional art. That is, there may be a space more useful to the user in a same administration district, there may be no space over several administration districts, or it may be necessary to cluster contents having no administration district data. Thus, according to an exemplary embodiment, the contents are clustered based on the coordinate information of each of the contents by using the distance limit point calculated by a distance limit point calculation unit 160 of FIG. 1 instead of an administration district unit.

That is, if a predetermined number of contents (for example, more than 10) are included in the distance limit point calculated by a distance limit point calculation unit 160 among all contents included in the content display control apparatus 100, the content clustering unit 165 of FIG. 1 clusters or groups the corresponding contents into one cluster by using the distance limit point. For example, when the distance limit point is 5 km, if 10 pieces of contents are included in 5 km, the content clustering unit may generate one cluster and include the 10 contents in the generated cluster.

This will be described in more detail. In this regard, it is assumed that contents are photos.

In operation S201, it is determined whether a review target photo P exists in the content control display apparatus 100. If the review target photo P is not present in the content control display apparatus 100, operation S200 ends. If the review target photo P is present in the content control display apparatus 100, operation S203 is performed. For example, if 100 photos are present in the content control display apparatus 100, a $1^{st}$ photo among the 100 photos may be established as the review target photo P to proceed to a next operation.

In operation S203, location information of the first photo that is the review target photo P is extracted.

In operation S205, it is determined whether more than a "predetermined number" of photos are present within a "predetermined distance" of the review target photo P, and the photos are established as target photos N. In this regard, the predetermined distance may be the above-described distance limit point. For example, it is determined whether 10 or more photos are present within 5 km that is the distance limit point from the $1^{st}$ photo that is the review target photo P.

If the clustering target photos N more than the "predetermined number" are not present within the "predetermined distance" of the review target photo P, operation S221 is performed and then operation S203 is performed again on a next photo (the $2^{nd}$ photo).

Meanwhile, if there are more clustering target photos N than the "predetermined number" within the "predetermined distance" of the review target photo P, in operation S207, a new region cluster C is generated, and the review target photo P is added as a member of the cluster C. That is, the $1^{st}$ cluster is generated, and the $1^{st}$ photo is added as a member of the $1^{st}$ cluster. In this operation, photos other than the review target photo P, i.e. photos (for example, $2^{nd}$~$11^{th}$ photos) within a predetermined distance from the review target photo P are not added as members of the $1^{st}$ cluster.

Next, in operation S209, location information of a review target photo NP among the clustering target photos N is extracted. In operation S211, the review target photo NP is added as the member of the cluster C. That is, location information of the $2^{nd}$ photo is extracted and then the $2^{nd}$ photo is added as the member of the $1^{st}$ cluster.

Next, in operation S213, it is determined whether there are more $2^{nd}$ clustering target photos N' than a "predetermined number" within a "predetermined distance" of the review target photo NP. In this regard, the predetermined distance may be the above-described distance limit point. For example, it is determined whether 10 or more photos are present within 5 km that is the distance limit point from the $2^{nd}$ photo that is the review target photo NP.

If there are not more $2^{nd}$ clustering target photos N' than the "predetermined number" within the "predetermined distance" of the review target photo NP, operation S223 is performed and then operation S209 is performed again on a next photo (a $3^{rd}$ photo).

Meanwhile, if there are more $2^{nd}$ clustering target photos N' than the "predetermined number" within the "predetermined distance" of the review target photo NP, in operation S215, a union of the original clustering target photos N and the $2^{nd}$ clustering target photos N' is updated as new clustering target photos N. For example, if 15 photos (the $1^{st}$ photo~the $16^{th}$ photo excluding the $2^{nd}$ photo) are present within 5 km from the $2^{nd}$ photo, the $1^{st}$ photo~the $16^{th}$ photo that is the union of the $2^{nd}$ photo~the $11^{th}$ photo that are the original clustering target photos N and the $1^{st}$ photo and the $3^{rd}$ photo~the $16^{th}$ photo that are the $2^{nd}$ clustering target photos N' are updated as the new clustering target photos N.

Thereafter, regarding the next photo (the $3^{rd}$ photo) after operation S223, in operation S219, it is determined whether the review target photo NP is present in the newly updated clustering target photos N, and, if the review target photo NP is present in the newly updated clustering target photos N, operation S209 is performed again. Otherwise, if the review target photo NP is not present in the newly updated clustering target photos N, operation S221 is performed and then operation S203 is performed again on a next photo.

The above-described process is performed, and, if contents included in the distance limit point are more than a predetermined number, the corresponding contents are clustered into one cluster.

Figure 9:
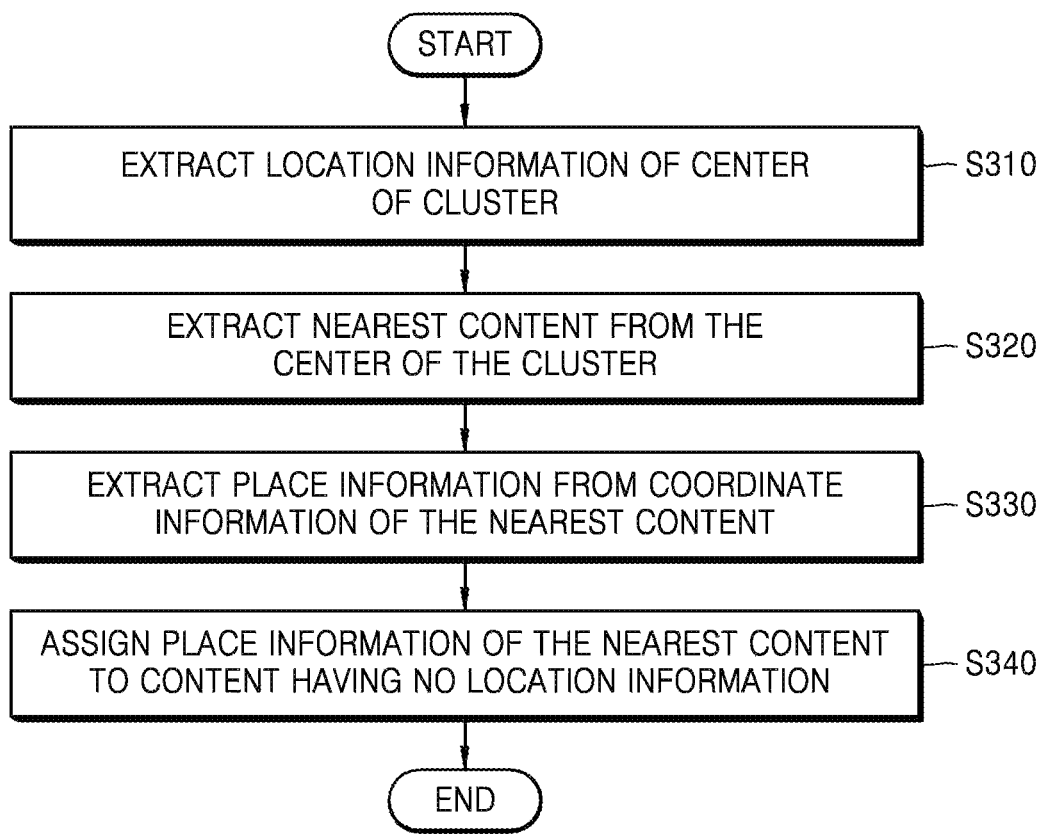
FIG. 9 is a flowchart illustrating an operation S300 of the content display control method of FIG. 7.

FIG. 9 is a flowchart illustrating operation S300 of the content display control method of FIG. 7. Referring to FIG. 9, representative place information of each cluster is extracted, and the representative place information is assigned to content having no place information among the contents of each cluster as place information of the corresponding content (S300).

In more detail, place information may be extracted from coordinate information in contents that store location information in a coordinate form of (longitude, latitude). In this regard, a first administration district (for example, city and province), a second administration district (for example, city, county, and district), a third administration district (for example, town, township, and neighborhood), and a country name may be extracted as the place information.

Some of the contents may include both the coordinate information and the place information, whereas other contents may include only the coordinate information. In this case, although it may be most exact to extract the place information from the coordinate information of each of the contents having no place information, it is practically limited (a response speed delay, an API use cost, etc.)

Therefore, the content display control method according to an exemplary embodiment extracts the representative place information of each cluster, and assigns the representative place information to the content having no place information among the contents of each cluster as the place information of the content included in the cluster.

To this end, the place information assigning unit 170 of FIG. 1 extracts the representative place information of each cluster, and assigns the representative place information to the content having no place information among the contents of each cluster as the place information of the corresponding content. That is, the place information assigning unit 170 establishes a place of the content closest to a center of each cluster as a representative place and assigns the representative place to place information of the content having no place information.

In more detail, in operation S310, location information of the center of each cluster is extracted.

Next, in operation S320, the nearest content closest to the center of each cluster is extracted. That is, the nearest content closest to the center of each cluster is determined as a representative location, and location information of the representative location is extracted.

Next, in operation S330, place information is extracted from coordinate information of the nearest content. The place information may include one or more ones of the first administration district (for example, city and province), the second administration district (for example, city, county, and ku), the third administration district (for example, eup, myon, and dong), and the country name.

Next, in operation S340, the extracted place information is assigned to the content having no place information among the contents included in each cluster as the place information.

As described above, although place information of each of the contents is not calculated, exact or approximate place information of each of the contents may quickly and easily be obtained.

Figure 10:
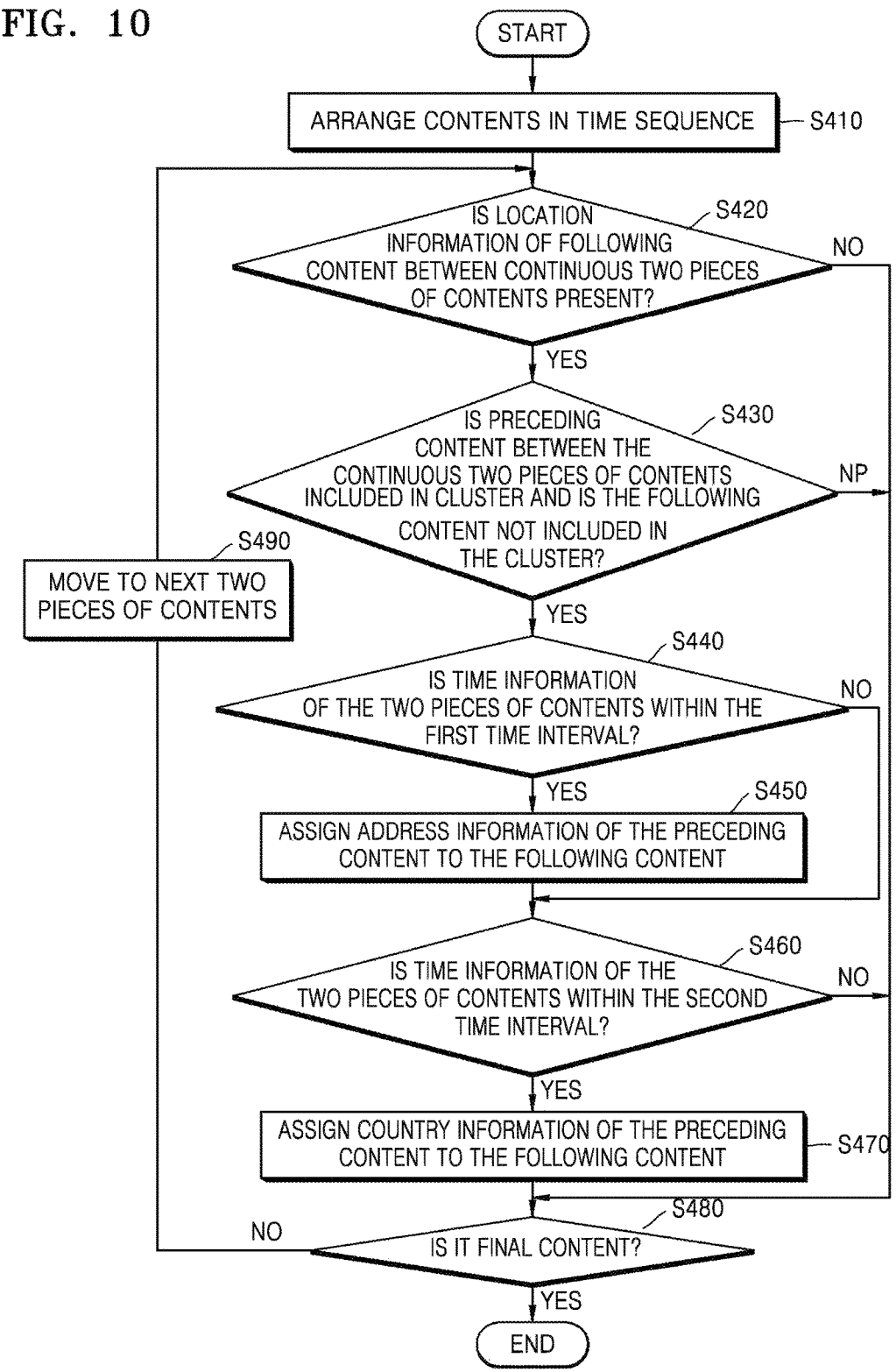
FIG. 10 is a flowchart illustrating an operation S400 of the content display control method of FIG. 7.

FIG. 10 is a flowchart illustrating operation S400 of the content display control method of FIG. 7. Referring to FIG. 10, location information of content temporally adjacent to content having no location information among the contents of each cluster is assigned to the content having no location information (S400).

In more detail, some of the contents may not include location information. For example, a photo captured by a camera having no GPS may not include the location information. This may be a factor that deteriorates exact clustering.

To solve this problem, the content display control method according to an exemplary embodiment may assign the location information of the content temporally adjacent to the content having no location information among the contents of each cluster to the content having no location information.

To this end, the location information assigning unit 175 of FIG. 1 assigns the location information of the content temporally adjacent to the content having no location information among the contents of each cluster to the content having no location information.

In more detail, in operation S410, contents included in the content display control apparatus 100 are arranged in a time sequence.

Next, in operation S420, it is determined whether location information of following content between continuous two pieces of contents among the contents arranged in the time sequence is present. If the location information of the following content is present, operation S480 is performed to determine whether the following content is final content. If the following content is not the final content, a process is performed on the next two pieces of contents in operation S490.

Meanwhile, if the location information of the following content is not present, it is determined whether preceding content between the continuous two pieces of contents is included in a cluster and the following content is not included in the cluster in operation S430.

If the following content is not included in the cluster or the following content is included in the cluster, operation S480 is performed to determine whether the following content is final content. If the following content is not the final content, a process is performed on the next two pieces of contents in operation S490.

If the following content is included in the cluster or the following content is not included in the cluster, it is determined whether a difference in time information between the two pieces of contents is within the $1^{st}$ time interval, for example, 30 minutes, in operation S440. That is, when preceding content including location information and belonging to a cluster and following content that does not include location information and does not belong to a cluster are generated at a predetermined time interval, it is expected to have a high probability that the two pieces of contents are generated in a same or similar place.

If the difference in the time information between the two pieces of contents is within 30 minutes, address information among the location information of the preceding content may be assigned as location information of the following content.

It is also determined whether the difference in the time information between the two pieces of contents is within the $2^{nd}$ time interval, for example, 1 day, in operation S460. If the difference in the time information between the two pieces of contents is within 1 day, country information among the location information of the preceding content may be assigned as location information of the following content.

As described above, the location information of the content temporally adjacent to the content having no location information is assigned to the content having no location information, thereby obtaining an effect of clustering the contents more exactly and simultaneously preventing the contents from being left out from clustering.

Figure 11:
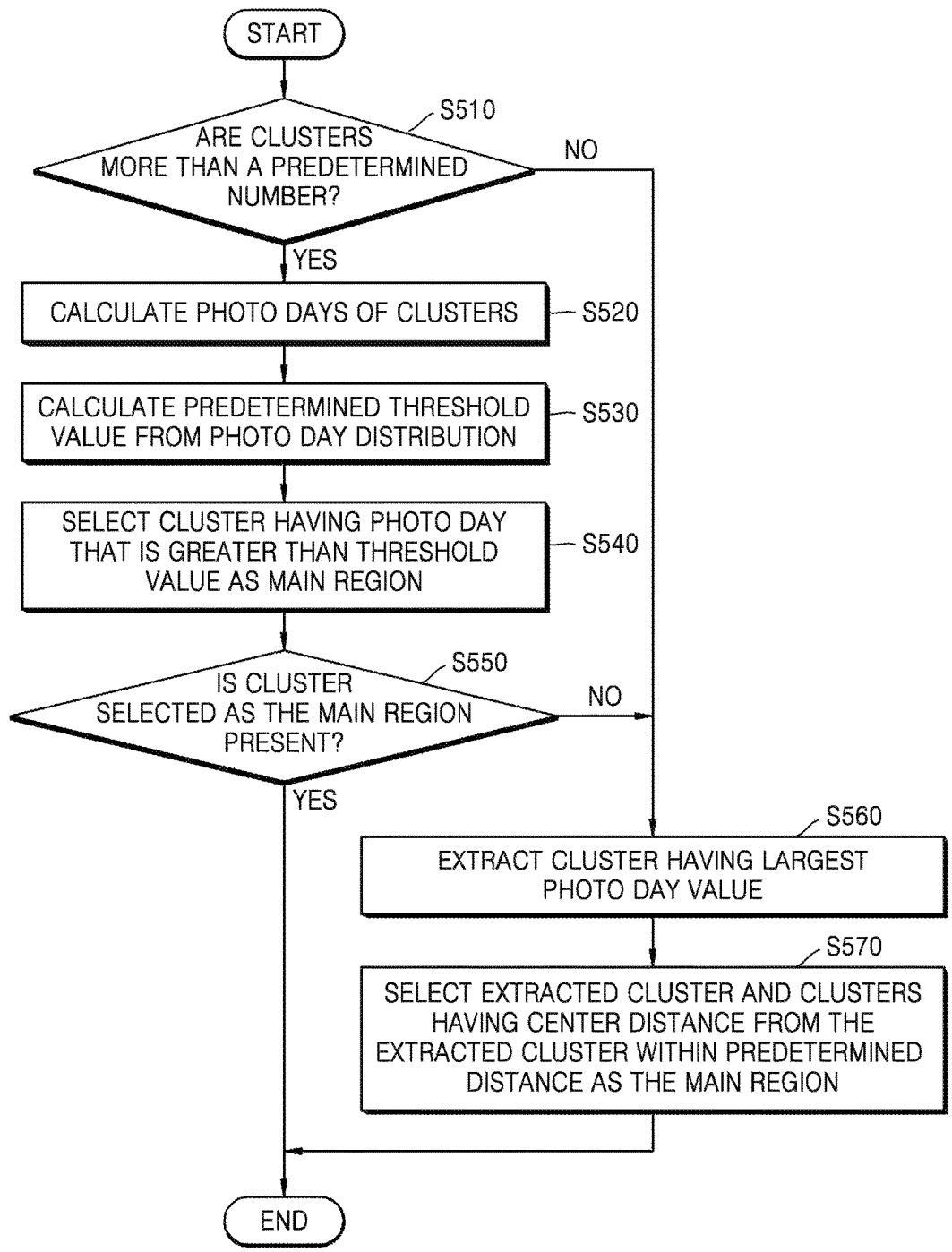
FIG. 11 is a flowchart illustrating an operation S500 of the content display control method of FIG. 7.

FIG. 11 is a flowchart illustrating operation S500 of the content display control method of FIG. 7. Referring to FIG. 11, a main region is selected from among the one or more clustered clusters based on a photo day (S500). In this regard, the photo day means a number of dates on which contents are distributed in time information of the contents included in each cluster. For example, if photos taken on May 18, 2014, May 20, 2014, and Jun. 3, 2014 are included in a cluster, the photo days of the cluster are 3 (the photo period of the cluster is May 18, 2014~Jun. 3, 2014).

The operation of selecting the main region is as follows.

In operation S510, a main region selecting unit 180 of FIG. 1 determines whether a total number of clusters included in the content display control apparatus 100 is more than a predetermined number, for example, 5.

If the total number of clusters included in the content display control apparatus 100 is less than the predetermined number, for example, 5, a cluster having a largest photo day value is extracted (operation S560). The extracted cluster and clusters having a center distance from the extracted cluster within a predetermined distance are selected as the main region (operation S570). That is, if the total number of clusters is too small, the operation of determining a separate threshold value is omitted, and a cluster having the largest photo day value is simply selected as the main region.

Meanwhile, if the total number of clusters included in the content display control apparatus 100 is more than the predetermined number, for example, 5, the photo day of each cluster is calculated in operation S520.

In operation S530, a predetermined threshold value is calculated from a distribution of photo days of the clusters. In this regard, the predetermined threshold value may be calculated using an outlier calculation method that uses, for example, an interquartile range (IQR). In this regard, the IQR is a value by halving a distance from a third IQR C75 to a first IQR C25. The IQR is used to determine a variability level by a distance between two points having the same percentage in left and right of a center value of a center of the distribution. A large IQR means a scarce distribution. A small IQR means a dense distribution. The IQR is advantageously less influenced by extreme values of a material. That is, a method of calculating the IQR and the threshold value using the IQR is as follows.

$$IQR = Q3 - Q1$$

$$\text{Threshold value} = Q3 + 1.5 * IQR$$

The predetermined threshold value may be calculated as described above. However, the present invention is not limited thereto. Various methods of extracting the predetermined threshold value having a specific meaning from among several values may be utilized.

In operation S540, a cluster having the photo day value that is greater than the calculated predetermined threshold value is selected as the main region.

Next, in operation S550, it is determined whether there is a cluster selected as the main region through the above-described process, and, if there is a cluster selected as the main region, the process ends.

Meanwhile, if there is no cluster selected as the main region, the cluster having the largest photo day value is extracted in operation S560. The extracted cluster and clusters having the center distance from the extracted cluster within the predetermined distance are selected as the main region in operation S570. That is, if there is no cluster having a photo day value that is greater than the threshold value, the cluster having the largest photo day value is simply selected as the main region.

Figure 12:
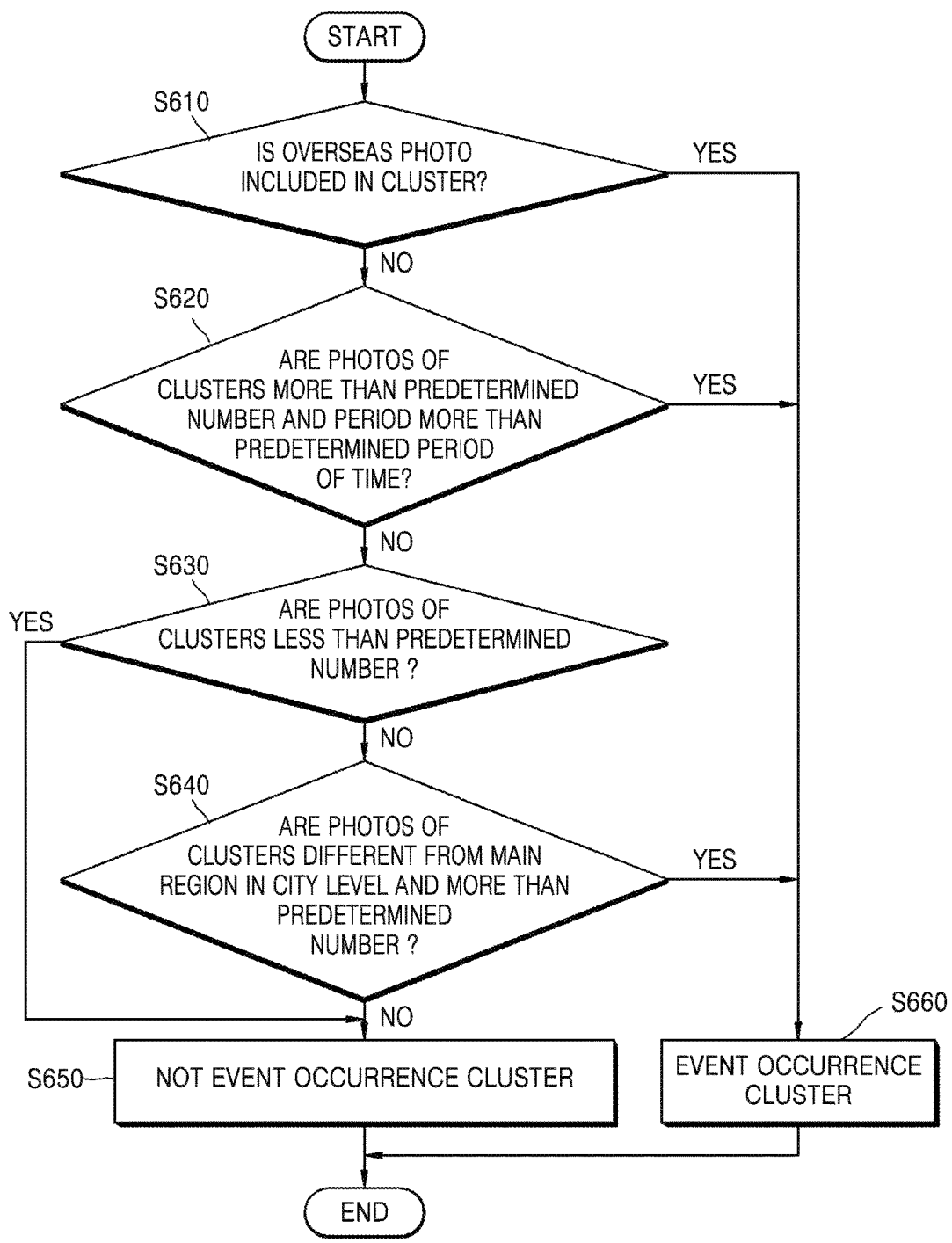
FIG. 12 is a flowchart illustrating an operation S600 of the content display control method of FIG. 7.

FIG. 12 is a flowchart illustrating an operation S600 of the content display control method of FIG. 7. Referring to FIG. 12, an event cluster in which an event is expected to occur with respect to the selected main region is selected (S600).

In this regard, the event means an episode having a special purpose such as travel. When content generated on a date on which a particular event occurs is clustered into one cluster, and a user selects an event tab 22 of FIG. 2, the event cluster is selected so as to provide the user with a region in which the event occurs and content clustered in the region in which the event occurs.

In this regard, an operation of selecting the event cluster may include selecting one or more event candidate clusters and selecting a cluster satisfying a predetermined condition among the event candidate clusters as the event cluster.

A method of selecting the event candidate clusters is as follows.

All pieces of contents may be arranged in a time sequence, 1) when location information of neighboring two pieces of contents is overseas, and a difference in time information of the two pieces of contents is within a predetermined period, 2) when the location information of the neighboring two pieces of contents is not a main region, and the difference in the time information of the two pieces of contents is within the predetermined period, or 3) when the location information of at least one of the neighboring two pieces of contents is the main region in a city level but is not the same as the main region, and the difference in the time information of the two pieces of contents is within the predetermined period, contents satisfying conditions 1), 2), or 3) may be configured as one cluster, and the cluster may be selected as the event candidate cluster.

In this regard, "overseas" may be defined as a country other than a country to which the main region belongs. Since main regions may be plural, overseas may also be a plurality of countries. The "city level' may mean a first administration district (for example, city and province).

When condition 1) is satisfied, the contents are determined to be generated during an overseas travel of a user, the contents generated during the overseas travel of a user are configured as one cluster, and the cluster is selected as the event candidate cluster.

Alternatively, when condition 2) is satisfied, the contents are determined to be generated during a local travel of the user, the corresponding contents are configured as one cluster, and the cluster is selected as the event candidate cluster.

Alternatively, when condition 3) is satisfied, it is determined that "an event such as a travel occurs in my city" or "a travel just starts or ends from my city to another city", the corresponding contents are configured as one cluster, and the cluster is selected as the event candidate cluster.

Next, an operation of selecting a cluster satisfying a predetermined condition among the event candidate clusters as the event cluster is as follows.

Referring to FIG. 12, the cluster satisfying the following predetermined condition among the event candidate clusters is selected as the event cluster.

In operation S610, when there is content generated overseas among the contents configured as the cluster, the corresponding cluster is selected as an event occurrence cluster.

Next, in operation S620, when the contents configured as the cluster is more than a predetermined number, for example, 11, and a period of time for which the contents are generated is more than a predetermined period of time, for example, 10 minutes, the corresponding cluster is selected as the event occurrence cluster. That is, the event candidate cluster is selected as the event occurrence cluster, except that the number of contents is too many to be an event cluster among the event candidate clusters, and since contents are generated during a very short period of time, it is not determined as the event such as the travel.

Next, in operation S630, it is determined whether the contents configured as the cluster is less than a predetermined number, for example, 3, and, if the contents configured as the cluster is less than the predetermined number, the corresponding cluster is not determined as the event occurrence cluster.

Meanwhile, if the contents configured as the cluster is more than the predetermined number, when the contents configured as the cluster are different from the main region in the city level, and photos are more than a predetermined number, for example, 7, the cluster satisfying conditions that the contents are different from the main region in the city level, and the photos are more than the predetermined number is selected as the event occurrence cluster.

According to the exemplary embodiments described above, one or more clusters are formed from location information of a plurality of pieces of contents, an event cluster having a high probability of an event occurrence is selected among the clusters, and the selected event cluster is provided to a user, thereby obtaining an effect of easily organizing and keeping the contents. As described above, the event cluster is selected and provided to the user, thereby allowing the user to more quickly and conveniently approach desired content, improving user convenience, and increasing UI/UX interest. Furthermore, location information is provided to content having no location information among the contents, thereby performing more accurate clustering and simultaneously preventing content from being left out from clustering.

Figure 13:
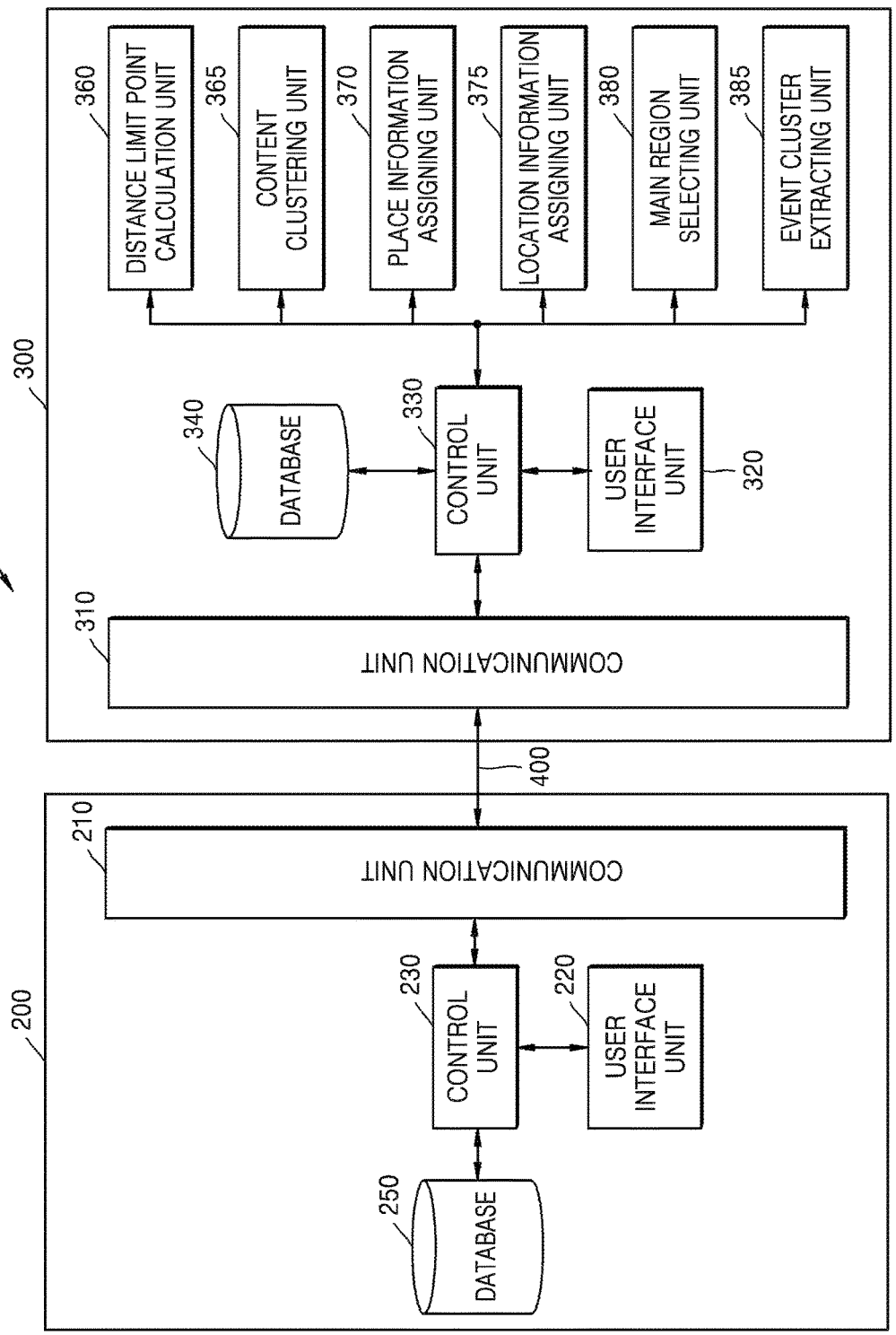
FIG. 13 is a schematic block diagram of a content display control system according to an exemplary embodiment.

A content display control system according to an exemplary embodiment will be described below. FIG. 13 is a schematic block diagram of a content display control system 10 according to an exemplary embodiment.

Referring to FIG. 13, the content display control system 10 according to an exemplary embodiment includes a content display control apparatus 200 and a clustering server 300. In this regard, the content display control apparatus 200 may include a communication unit 210, a user interface unit 220, a control unit 230, and a database 250. The clustering server 300 may include a communication unit 310, a user interface unit 320, a control unit 330, and a database 340. The clustering server 300 may further include a distance limit point calculation unit 360, a content clustering unit 365, a place information assigning unit 370, a location information assigning unit 375, a main region selecting unit 380, and an event cluster extracting unit 385.

The difference between the present embodiment and the embodiment described with reference to FIG. 1 is that a single content display control apparatus does not display contents and perform clustering but the content display control apparatus 200 displays contents and the clustering server 300 performs clustering. That is, in the embodiment described with reference to FIG. 1, the content display control apparatus 100 may include various clustering elements to display contents and perform clustering without communication with outside the content display control apparatus 100, whereas, in the present embodiment, the content display control apparatus 200 may transmit contents or location information and time information included in the contents, and the clustering server 300 may include all clustering related elements, perform clustering on each piece of the contents, and transmit clustering results to the content display control apparatus 200.

The exemplary embodiments may be implemented with a program executable on a computer, and may be implemented on a digital computer for executing the program by using a computer-readable recording medium. Examples of the computer-readable recording medium may include storage media such as magnetic storage media (e.g., ROM, floppy disks, hard disks, etc.) and optical recording media (e.g., CD-ROMs, or DVDs). Furthermore, a program for executing the content display control method according to an embodiment on a computer and a distribution server for distributing the program are provided.

Examples of the program commands include a high-level language code that may be executed by a computer using an interpreter as well as a machine language code made by a complier.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

As described above, according to the one or more of the above exemplary embodiments, a content display control apparatus, a content display control method, and a computer program for executing the content display control method on a computer may form one or more clusters from location information of a plurality of pieces of contents, select an event cluster having a high probability of an event occurrence, and provide the selected event cluster to a user, thereby obtaining an effect of easily organizing and keeping the contents.

According to the one or more of the above exemplary embodiments, a content display control apparatus, a content display control method, and a computer program for executing the content display control method on a computer may select and provide an event cluster to a user, thereby obtaining an effect of allowing the user to more quickly and conveniently approach desired content, improving user convenience, and increasing UI/UX interest.

According to the one or more of the above exemplary embodiments, a content display control apparatus, a content display control method, and a computer program for executing the content display control method on a computer may provide location information to content having no location information among contents, thereby obtaining an effect of performing more accurate clustering and simultaneously preventing content from being left out from clustering.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A content display control apparatus for displaying contents grouped into one or more clusters, comprising:
    a processor configured to include a plurality of functional units comprising,
        a distance limit point calculation unit for calculating distance values between the contents from coordinate information of the contents and calculating a distance limit point based on the distance values, the coordinate information including map coordinates;
        a content clustering unit for, if select contents included within the distance limit point is more than a predetermined number, clustering the select contents into a cluster;
        a place name information assigning unit for extracting representative place name information of the cluster and assigning the representative place name information to each content in the cluster having no place name information, the place name information indicating a geographical administrative area;
        a main region selecting unit for selecting a main region from among the one or more clusters;
        an event cluster extracting unit for selecting an event cluster in which it is expected that an event has occurred, based on the selected main region; and
        a control unit for displaying the contents on a map;
        wherein the place name information assigning unit extracts center map coordinates of each of the one or more clusters, extracts nearest content from the center map coordinates of each of the one or more clusters, extracts the place name information from the map coordinates of the nearest content, and assigns the extracted place name information to the content having no place name information among the contents included in each of the one or more clusters.

2. The content display control apparatus of claim 1, wherein the processor further comprises a coordinate information assigning unit for assigning coordinate information of content temporally adjacent to content having no coordinate information among the contents to the content having no coordinate information.

3. The content display control apparatus of claim 2, wherein the coordinate information assigning unit arranges the contents in a time sequence, and when a preceding content of temporally adjacent two contents is included in the one or more clusters and a following content of the two contents is not included in the one or more clusters, and when a difference in time information of the two contents is within a predetermined time, assigns the coordinate information of the preceding information to the following content.

4. The content display control apparatus of claim 1, wherein the distance limit point calculation unit extracts an nth distance value from each of the contents to an nth content away from the each of the contents, and calculates the distance limit point from the extracted nth distance values.

5. The content display control apparatus of claim 1, wherein the main region selecting unit extracts a number of dates, on which the contents included in each of the one or more clusters are generated, based on time information of the contents, and selects a cluster having the number of dates more than a predetermined threshold value as the main region.

6. The content display control apparatus of claim 5, wherein the main region selecting unit selects a cluster having a largest number of dates, on which the contents included in the cluster are generated, as the main region when there is no cluster having the number of dates, on which the contents are generated, more than the predetermined threshold value.

7. The content display control apparatus of claim 1, wherein the event cluster extracting unit selects one or more event candidate clusters and selects a cluster satisfying a predetermined condition from among the one or more event candidate clusters as the event cluster.

8. The content display control apparatus of claim 7, wherein the event cluster extracting unit arranges the one or more contents in a time sequence and selects a cluster satisfying the following condition as the event candidate clusters:
    when coordinate information of temporally adjacent two contents is overseas, and a difference in time information of the two contents is within a predetermined period,
    when the coordinate information of the two contents is not the main region, and the difference in the time information of the two contents is within a predetermined period, or
    when the coordinate information of at least one of the two contents is the main region in a city level but is not the same as the main region, and the difference in the time information of the two contents is within a predetermined period.

9. The content display control apparatus of claim 7, wherein the event cluster extracting unit selects a cluster satisfying the following condition as the event cluster among the event candidate clusters:
    when there is content of which coordinate information is overseas among contents included in the cluster,
    when the contents included in the cluster is more than a predetermined number, and a period of time in which the contents are generated is more than a predetermined period of time, or
    when the coordinate information of the contents included in the cluster is not the main region in a city level.

10. A content display control method for displaying contents grouped into one or more cluster, comprising:
    calculating, by a processor, distance values between the contents from coordinate information of the contents, and a distance limit point, based on the distance values, the coordinate information including map coordinates;
    if select contents included within the distance limit point is more than a predetermined number, clustering, by the processor, the select contents into a cluster;
    extracting representative place name information of the cluster and assigning the representative place name information to each content having no place name information in the cluster, the place name information indicating a geographical administrative area;
    selecting, by the processor, a main region from among one or more clusters;
    selecting, by the processor, an event cluster in which it is expected that an event has occurred, based on the selected main region; and
    displaying the contents on a map;
    wherein the assigning of the representative place name information comprises:
        extracting center map coordinates of each of the one or more clusters;

extracting nearest content from the center map coordinates of each of the one or more clusters;
extracting the place name information from the coordinate information of the nearest content; and
assigning the extracted place name information to the content having no place name information among the contents included in each of the one or more clusters.

11. The content display control method of claim 10, further comprising: after the clustering, assigning coordinate information of content temporally adjacent to content having no coordinate information among the contents to the content having no coordinate information.

12. The content display control method of claim 11, wherein the assigning of the coordinate information comprises:
arranging the contents in a time sequence; and
when a preceding content of temporally adjacent two contents is included in the one or more clusters and a following content of the two contents is not included in the one or more clusters, and when a difference in time information of the two contents is within a predetermined time, assigning the coordinate information of the preceding information to the following content.

13. The content display control method of claim 10, wherein the calculating of the distance limit point comprises:
extracting an nth distance value from each of the contents to an nth content away from the each of the contents; and
calculating the distance limit point from the extracted nth distance values.

14. The content display control method of claim 10, wherein the selecting of the main region comprises:
extracting a number of dates, on which the contents included in each of the one or more clusters are generated, based on time information of the contents; and
selecting a cluster having the number of dates more than a predetermined threshold value as the main region.

15. The content display control method of claim 14, wherein the selecting of the main region comprises: selecting a cluster having a largest number of dates, on which the contents included in the cluster are generated, as the main region when there is no cluster having the number of dates, on which the contents are generated, more than the predetermined threshold value.

16. The content display control method of claim 10, wherein the selecting of the event cluster comprises:
selecting one or more event candidate clusters; and
selecting a cluster satisfying a predetermined condition from among the one or more event candidate clusters as the event cluster.

* * * * *